US006430197B1

United States Patent
Park

(10) Patent No.: US 6,430,197 B1
(45) Date of Patent: Aug. 6, 2002

(54) ASYNCHRONOUS TRANSFER MODE (ATM) CELL MULTIPLEXING/DEMULTIPLEXING APPARATUS

(75) Inventor: Kyong-Yong Park, Seoul (KR)

(73) Assignee: Hyundai Electronics Inds. Co., Ltd., Kyonggi (KR)

( * ) Notice: Subject to any disclaimer, the term of this patent is extended or adjusted under 35 U.S.C. 154(b) by 0 days.

(21) Appl. No.: 09/079,930

(22) Filed: May 15, 1998

(30) Foreign Application Priority Data

Jun. 28, 1997 (KR) ............................................ 97-28647

(51) Int. Cl.$^7$ ................................................. H04J 3/24
(52) U.S. Cl. ......................................... 370/471; 370/474
(58) Field of Search ................................ 370/465, 469, 370/395, 399, 471, 474, 476, 421, 423, 359, 353, 392

(56) References Cited

U.S. PATENT DOCUMENTS

| 5,166,926 A | * 11/1992 | Cisneros et al. ............ 370/399 |
| 5,287,349 A | 2/1994 | Hyodo et al. |
| 5,390,184 A | * 2/1995 | Morris ........................ 370/399 |
| 5,450,411 A | 9/1995 | Heil |
| 5,784,370 A | * 7/1998 | Rich ........................... 370/395 |
| 5,812,550 A | * 9/1998 | Sohn et al. .................. 370/395 |

* cited by examiner

Primary Examiner—Huy D. Vu
Assistant Examiner—Phuongchau Ba Nguyen
(74) Attorney, Agent, or Firm—Lackenbach Siegel; J. Harold Nissen

(57) ABSTRACT

This invention relates to an ATM cell multiplexing/demultiplexing apparatus for inserts simple routing information in corresponding bits within an ATM cell and performing cell multiplexing/demultiplexing operation between a single ATM layer device and a number of physical layer devices using the routing information, the apparatus comprises: a decoding/demultiplexing unit for extracting routing information from a header of each ATM cell transmitted from the ATM layer device and demultiplexing the ATM cell according to the routing information extracted into the number of physical layer devices; an ATM cell multiplexing unit for multiplexing the ATM cells transmitted from the number of physical layer devices into the ATM layer device; a receiving routing unit for inserting routing information within a header of each ATM cell multiplexed by the ATM cell multiplexing unit; and a micro bus interface unit for interfacing the ATM layer device and the number of physical layer devices with respect to system operation and management information and transmitting an interrupt signal of each physical layer device to the ATM layer device.

18 Claims, 8 Drawing Sheets

ASYNCHRONOUS TRANSFER MODE (ATM) CELL MULTIPLEXING/DEMULTIPLEXING APPARATUS

BACKGROUND OF THE INVENTION

1. Field of the Invention

The present invention relates to an asynchronous transfer mode (ATM) cell multiplexing/demultiplexing apparatus for, after identifying routing information, transmitting ATM cells from a single ATM layer device to a plurality of physical layer devices and multiplexing the ATM cells transmitted from the number of physical layer devices into the single ATM layer device over a universal test and operation physical interface for ATM (UTOPIA) interface.

2. Discussion of Related Art

In an ATM system, user information is divided into predetermined-sized packets and destination information is appended to a packet header, so the user information is transmitted in fixed-length cells and then restored to the original information. The fixed-sized cell comprises a 48-byte information field and a 5-byte header. The cell header contains virtual channel and virtual path information and other control information. The user information is transmitted to a destination according to the virtual channel and path information in the cell header.

An architecture of an ATM protocol is conformable to an open systems interconnection (OSI) layer model. Each layer has its own proper function and a certain layer service is realized using a service of a layer located just below it. For the ATM protocol, a physical layer, ATM layer, and ATM adaptation layer (AAL) construct a lower layer, which performs proper ATM functions. The physical layer has a function of providing transmission resources for transmission of the ATM cells. The ATM layer generates and removes the cell header and establishes a virtual channel (VC) and virtual path (VP) of the cells, thus selecting a path. The ATM adaptation layer is located between the ATM layer and a higher layer and splits the user information in a unit of predetermined length for an adaptation to a cell construction before transmission.

This ATM system interfaces the ATM layer device and the physical layer device with respect to the ATM cells and maps them into a synchronous transfer mode (STM) frame, before transmission. The ATM layer device transmits the ATM cells to the physical layer based upon a segmentation and reassembly (SAR) interface. The physical layer device transmits the ATM cells to the ATM layer over the UTOPIA interface. A UTOPIA 1 level interface matches a single ATM layer device to a single physical layer device. A UTOPIA 2 level interface matches a single ATM layer device to a number of physical layer devices.

General functions of the ATM layer are set forth in the following description. The ATM layer device generates a header for controlling ATM cell transmission, appends it to the 48-byte information field, and transmits the header and the information field to the lower physical layer, or transmits the 48-byte information field to the higher ATM adaptation layer (ALL) after removing the header from a 53-byte cell. The ATM layer device also performs a cell multiplexing function of carrying cells generated from a plurality of virtual paths and virtual channels on a single transmission channel and a cell demultiplexing function of separating cells from a single channel and distributing them to a number of virtual paths or virtual channels.

FIG. 1 is a block diagram of a conventional ATM cell multiplexing/demultiplexing apparatus for performing ATM cell multiplexing and demultiplexing functions on the ATM layer. As shown in the drawing, the ATM cell multiplexing/demultiplexing apparatus includes: a number of demultiplexing buffers 1 to N for buffering ATM cells generated from each virtual line; a multiplexing/demultiplexing unit 10, for multiplexing the ATM cells from the demultiplexing buffers 1 to N and, for analyzing virtual path identifiers (VPI) and virtual channel identifiers of ATM cells transmitted from a multiplexing buffer 20 and demultiplexing the ATM cells into the demultiplexing buffers 1 to N; and a multiplexing buffer 20, for buffering the ATM cells multiplexed by the multiplexing/demultiplexing unit 10 and transmitting them to the physical layer device and, for receiving the ATM cells from the physical layer device.

Operation of this conventional ATM cell multiplexing/demultiplexing apparatus is described below.

The virtual lines are identified by the VCIs and VPIs and have the corresponding demultiplexing buffers 1 to N. The demultiplexing buffers 1 to N buffer the ATM cells transmitted via each virtual line and then output them according to priority of the cells in transmission. The multiplexing/demultiplexing unit 10 multiplexes the ATM cells from each demultiplexing buffer 1 to N into the multiplexing buffer 20. The multiplexing buffer 20 transmits the multiplexed ATM cells to the physical layer device, so that the cells can be transmitted to the destination.

The multiplexing buffer 20 also buffers the ATM cells from the physical layer device and transmits them to the multiplexing/demultiplexing unit 10. The multiplexing/demultiplexing unit 10 analyzes the header of the ATM cell from the multiplexing buffer 20 and determines whether or not to transmit the cell according to cell loss priority data registered in a cell loss priority field of the cell header. If the cell has important information to be transmitted, the multiplexing/demultiplexing unit 10 analyzes the VPI and VCI registered in another field of the header of the cell. If both the VPI and VCI are "0", the multiplexing/demultiplexing unit 10 transmits the ATM cell to the corresponding demultiplexing buffer 1. According to such manner, the multiplexing/demultiplexing unit 10 transmits the ATM cells to the demultiplexing buffers 1 to N of each virtual line corresponding to respective, analyzed VPIs and VCIs, thereby demultiplexing the ATM cells.

This conventional ATM cell multiplexing/demultiplexing apparatus performs the multiplexing/demultiplexing operation by the VPIs and VCIs, so it must have many buffers for each and every virtual line. This makes the configuration of the apparatus complicated. In addition, the conventional ATM cell multiplexing/demultiplexing apparatus must perform access to the ATM cell header to analyze the VCI and VPI during the ATM cell multiplexing/demultiplexing operation. This results in complicated control operation, thereby increasing load on the system. Because of increment of the load caused by the complicated control operation, the multiplexing/demultiplexing operation cannot be performed for all ATM cells, resulting in decrease of performance of the system.

SUMMARY OF THE INVENTION

Accordingly, the present invention is directed to an ATM cell multiplexing/demultiplexing apparatus that substantially obviates one or more of the limitations and disadvantages of the related art.

An objective of the present invention is to provide an ATM cell multiplexing/demultiplexing apparatus for performing a UTOPIA 2 level interface function using a UTOPIA 1 level interface.

Another objective of the present invention is to provide an ATM cell multiplexing/demultiplexing apparatus for performing multiplexing and demultiplexing operation using simple routing information, thereby reducing load and time required for analysis of an ATM cell header.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in an asynchronous transfer mode (ATM) system having a number of physical layer devices for transmitting ATM cells at low speed and an ATM layer device for transmitting ATM cells at high speed, an ATM cell multiplexing/demultiplexing apparatus comprises: a decoding/demultiplexing unit for extracting routing information from a header of each ATM cell transmitted from the ATM layer device and demultiplexing the ATM cell according to the routing information extracted into the number of physical layer devices; an ATM cell multiplexing unit for multiplexing the ATM cells transmitted from the number of physical layer devices into the ATM layer device; a receiving routing unit for inserting routing information within a header of each ATM cell multiplexed by the ATM cell multiplexing unit; and a micro bus interface unit for interfacing the ATM layer device and the number of physical layer devices with respect to system operation and management information and transmitting an interrupt signal of each physical layer device to the ATM layer device.

The ATM cell multiplexing/demultiplexing apparatus inserts simple routing information in corresponding bits within an ATM cell and performs cell multiplexing/demultiplexing operation between a single ATM layer device and a number of physical layer devices using the routing information. In case of demultiplexing ATM cells from the high speed transmission ATM layer device into the number of low speed transmission physical layer devices over the UTOPIA interface, this apparatus extracts routing information from an ATM cell, demultiplexes the ATM cell according to the extracted routing information, and removes the routing information before transmitting the cell. Alternatively, in case of multiplexing the ATM cells from the many low speed transmission physical layer devices into the high speed ATM layer device over the UTOPIA interface, this apparatus multiplexes the ATM cells transmitted from each physical layer device and inserts within the cell header routing information indicating a corresponding physical layer device from which the cell is transmitted before transmitting the cell to the ATM layer device. This apparatus also interfaces the ATM layer device and the number of physical layer devices with respect to system operation and management information and transmits an interrupt commanding stop of cell transmission which is generated when a physical layer device cannot receive the ATM cells.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention examples of which are illustrated in the accompanying drawings.

With reference to the accompanying drawings, the present invention is described below in detail.

Figure 1:
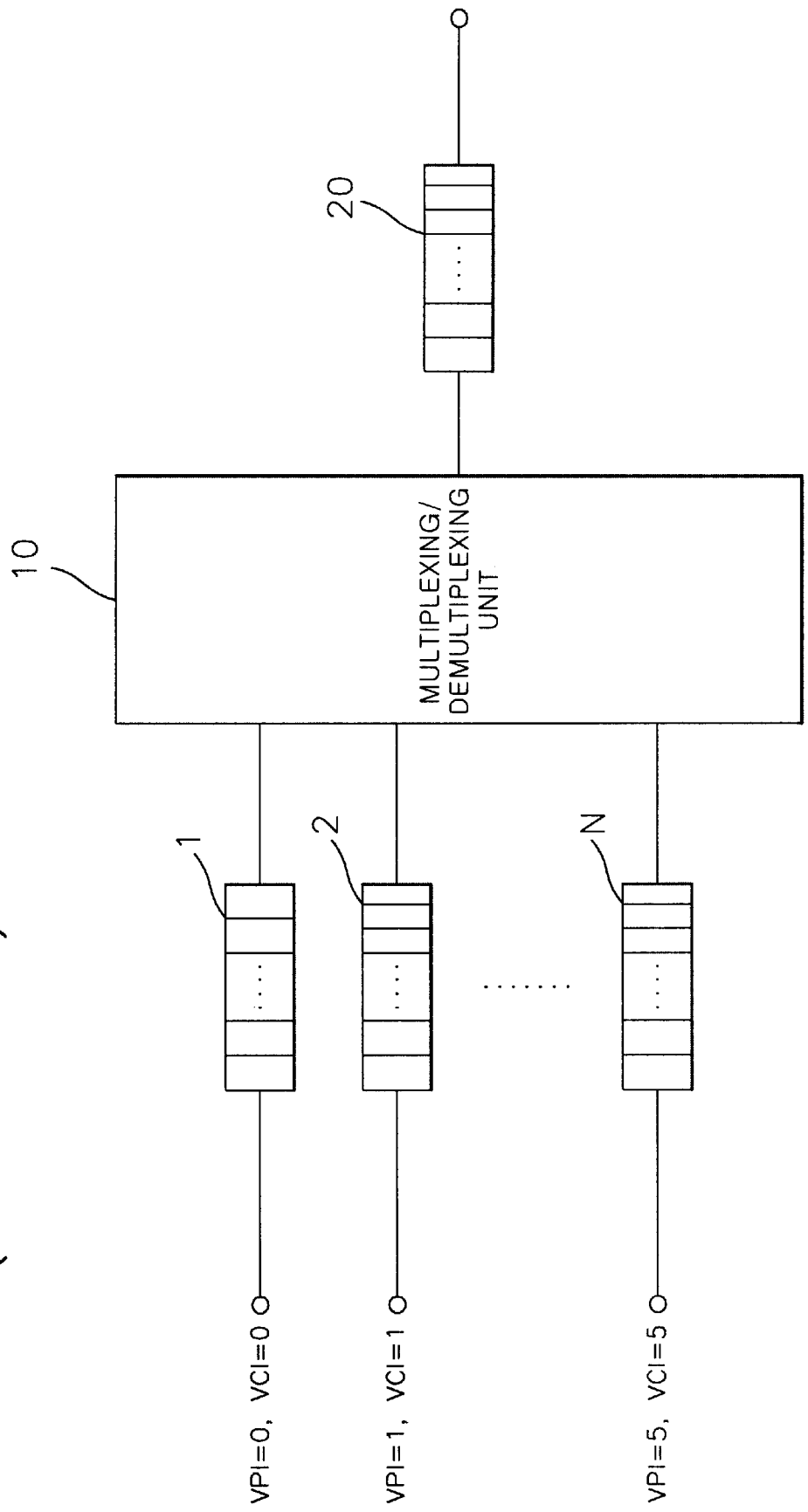
FIG. 1 is a block diagram of a conventional ATM cell multiplexing/demultiplexing apparatus.
Figure 2:
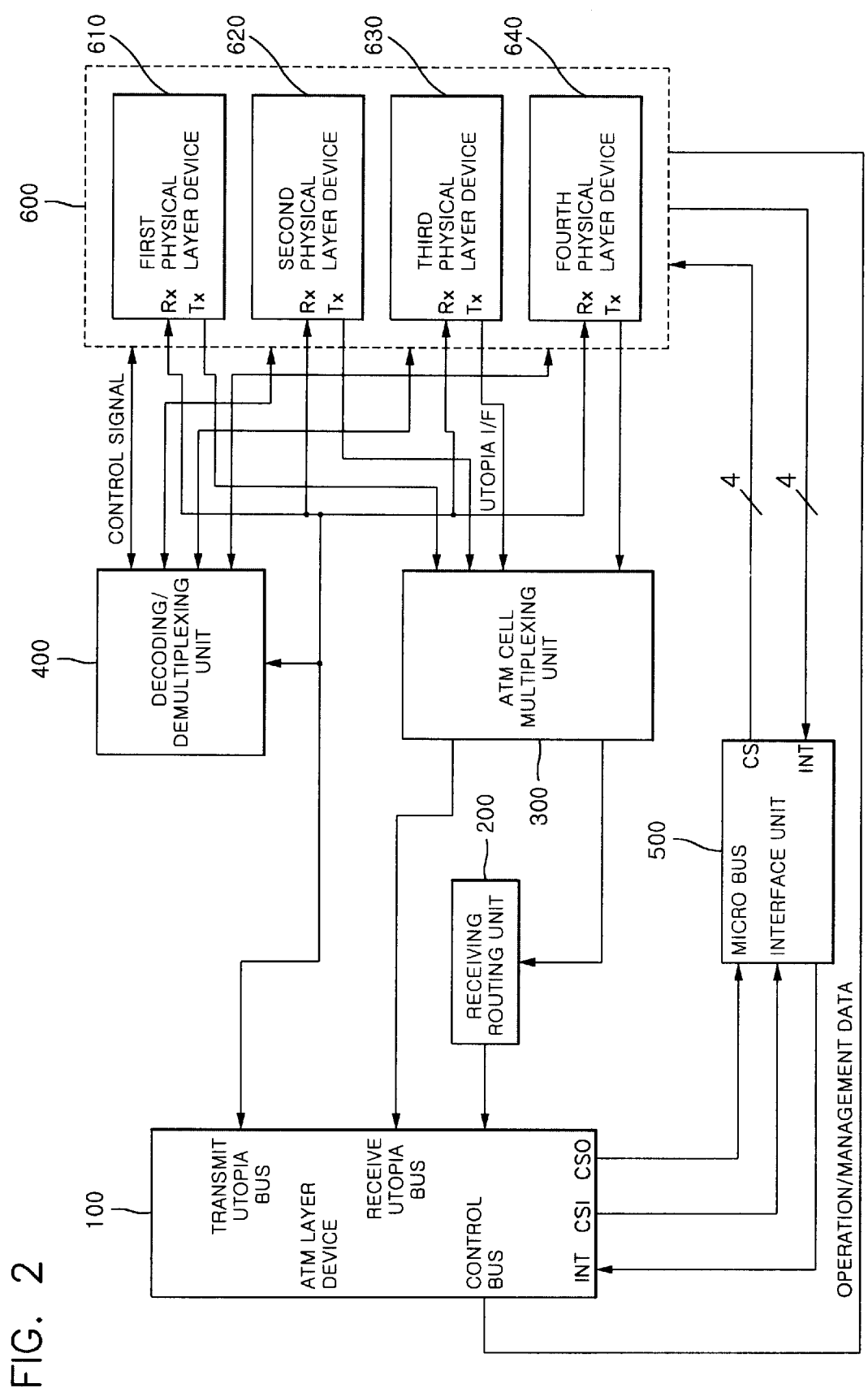
FIG. 2 is a block diagram of an ATM cell multiplexing/demultiplexing apparatus according to the present invention.

As shown in the block diagram of an ATM cell multiplexing/demultiplexing apparatus according to the present invention in FIG. 2, the apparatus includes: an ATM layer device 100 for constructing cells from data transmitted from an AAL and analyzing the header of a cell inputted thereto before transmitting the cell to the AAL; a decoding/demultiplexing unit 400 for extracting routing information from each header of the ATM cells transmitted from the ATM layer device 100 and demultiplexing the ATM cells into a physical layer device unit 600 according to the extracted routing information over a UTOPIA interface; an ATM cell multiplexing unit 300 for multiplexing ATM cells from the physical layer device unit 600 into the ATM layer device over the UTOPIA interface; a receiving routing unit 200 for inserting routing information within each header of the ATM cells multiplexed by the ATM cell multiplexing unit 300; the physical layer device unit 600 for forwarding the ATM cell from the ATM layer device 100 to a transmission line and sending ATM cells from the transmission line to the ATM cell multiplexing unit 300; and a micro bus interface unit 500 for interfacing the ATM layer device 100 and the physical layer device unit 600 with respect to system operation and management information.

Figure 5:
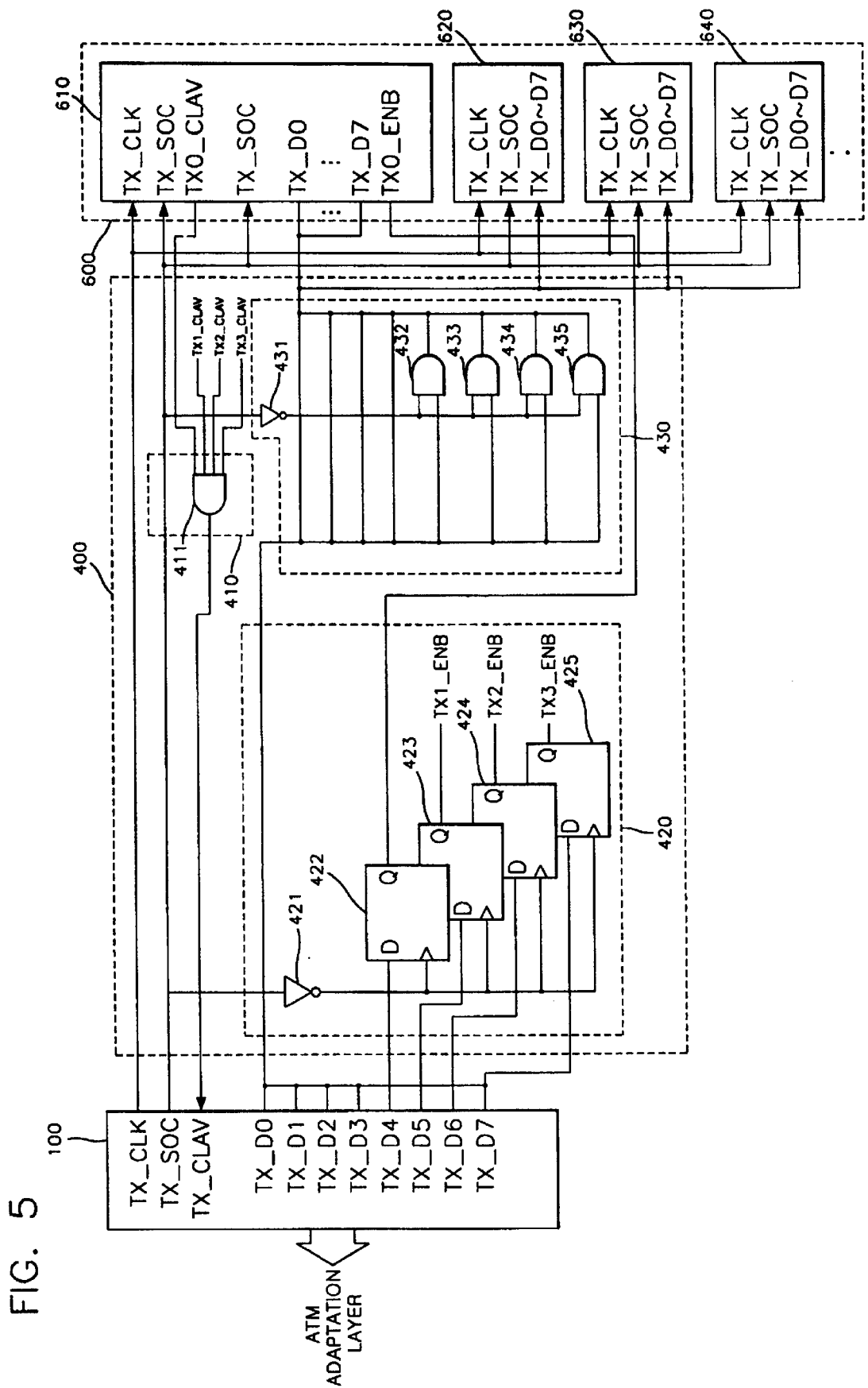
FIG. 5 is a detailed circuit diagram of the decoding/demultiplexing unit depicted in FIG. 2.

FIG. 5 illustrates an embodiment showing a configuration of the decoding/demultiplexing unit. As shown in the drawing, the decoding/demultiplexing unit 400 includes: a ready for receiving signal generation unit 410 for generating a signal for indicating that first to fourth physical layer devices 610 to 640 in the physical layer device unit 600 can receive cells; a routing information extraction unit 420 for extracting the routing information from the header of the ATM cell transmitted from the ATM layer device 100 and sending the cell to a corresponding physical layer device; and a routing information removing unit 430 for removing the routing information from the header of the ATM cell which will be transmitted to the physical layer device unit 600.

In case of the cell multiplexing operation, routing information is inserted in the first four bits of a VPI field or general flow control (GFC) field in a cell header to transmit the cell to a corresponding physical layer device amongst a plurality of physical layer devices. Conversely, in case of the cell demultiplexing operation, the routing information is removed from the cell header not to influence transmission of the cell to a user. In the embodiment of the present invention, the routing information is supposed to be inserted within and removed from the first four bits of the VPI field other than the GFC field.

The ready for receiving signal generation unit 410 consists of an AND gate 411 for performing an AND operation with respect to the signals for indicating ATM cell receptivity which are generated from each physical layer device 610 to 640 and producing a signal for indicating that the physical layer device unit 600 is in the status capable of receiving the cells.

The routing information extraction unit 420 includes: an inverter 421 for inverting a signal, TX_SOC, for indicating a first byte of the transmission cell generated by the ATM layer device 100; and first to fourth D-flip-flops 422 to 425 for buffering unused, first four bits of the GFC or VPI field in the ATM cell header according to clocking of a signal produced by the inverter 421 and transmitting the four bits to each corresponding physical layer device 610 to 640 as a signal for indicating validity of the cell.

The routing information removing unit 430 includes: an inverter 431 for inverting the first byte indication signal of a transmission cell generated by the ATM layer device 100 and transmitting an inverted signal to multiple AND gates 432 to 435; and first to fourth AND gates 432 to 435 for performing each AND operation with respect to an output signal of the inverter 431 and respective specified bits in the ATM cell header, thereby each removing one bit of the routing information.

Figure 3:
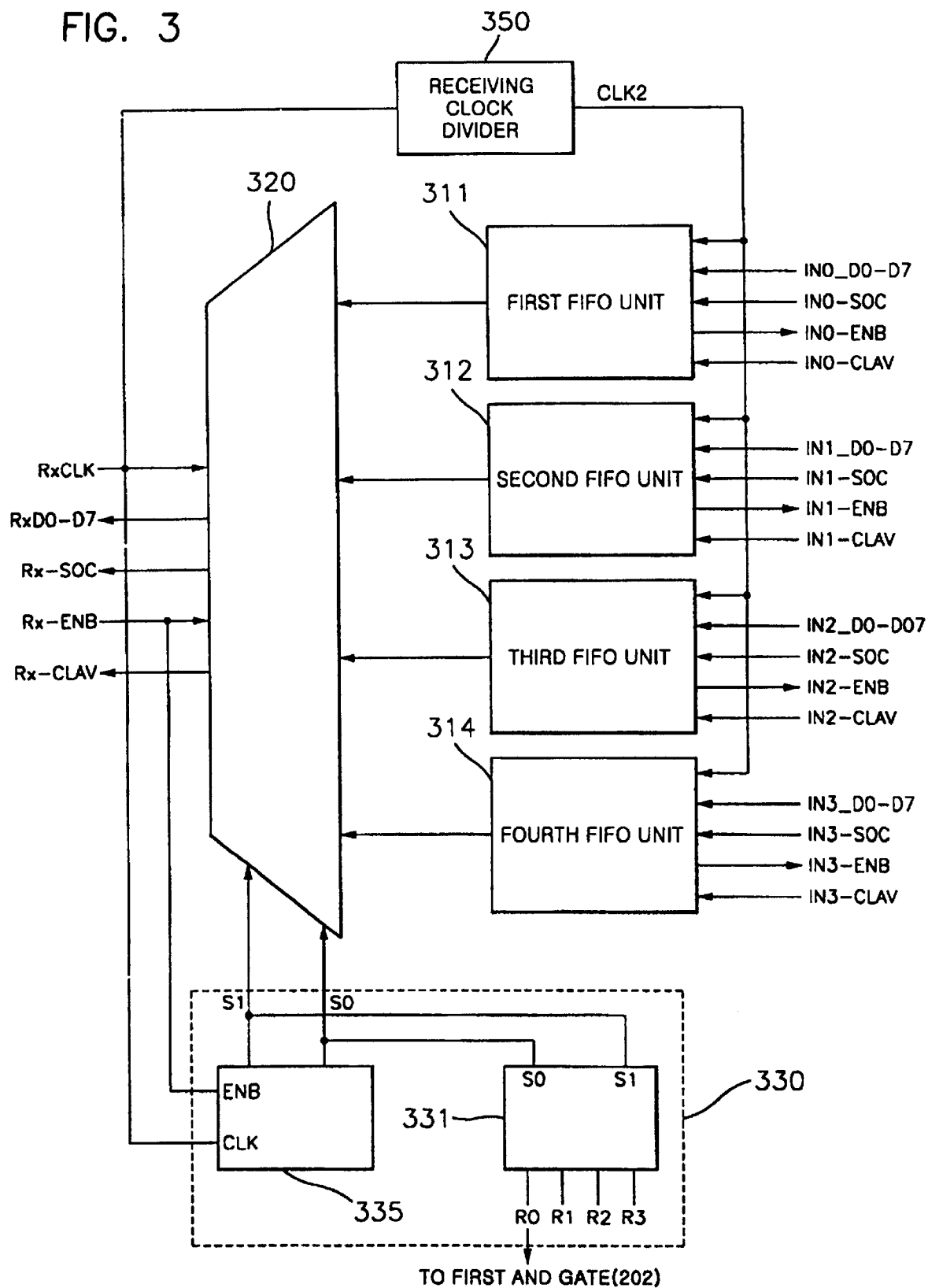
FIG. 3 is a detailed block diagram of the ATM cell multiplexing unit of the ATM cell multiplexing/demultiplexing apparatus depicted in FIG. 2.

FIG. 3 show a configuration of the ATM cell multiplexing unit in accordance with the present invention. As shown in the drawing, the ATM cell multiplexing unit 300 includes: first to fourth FIFO units 311 to 314 for respectively buffering and performing FIFO with respect to the ATM cells from each physical layer device 610 to 640 in the physical layer device unit 600; a multiplexing unit 320 for multiplexing the ATM cells from the first to fourth FIFO units 311 to 314 according to multiplexing control signals; and a multiplexing control unit 330 for controlling the multiplexing unit 320.

The multiplexing control unit 330 includes: a FIFO control unit 335 for generating control signals for controlling the multiplexing unit 320; and a decoder 331 for generating first to fourth decoding signals, R0 to R3, by decoding the first and second FIFO control signals, S0 and S1, generated by the FIFO control unit 335.

Figure 4:
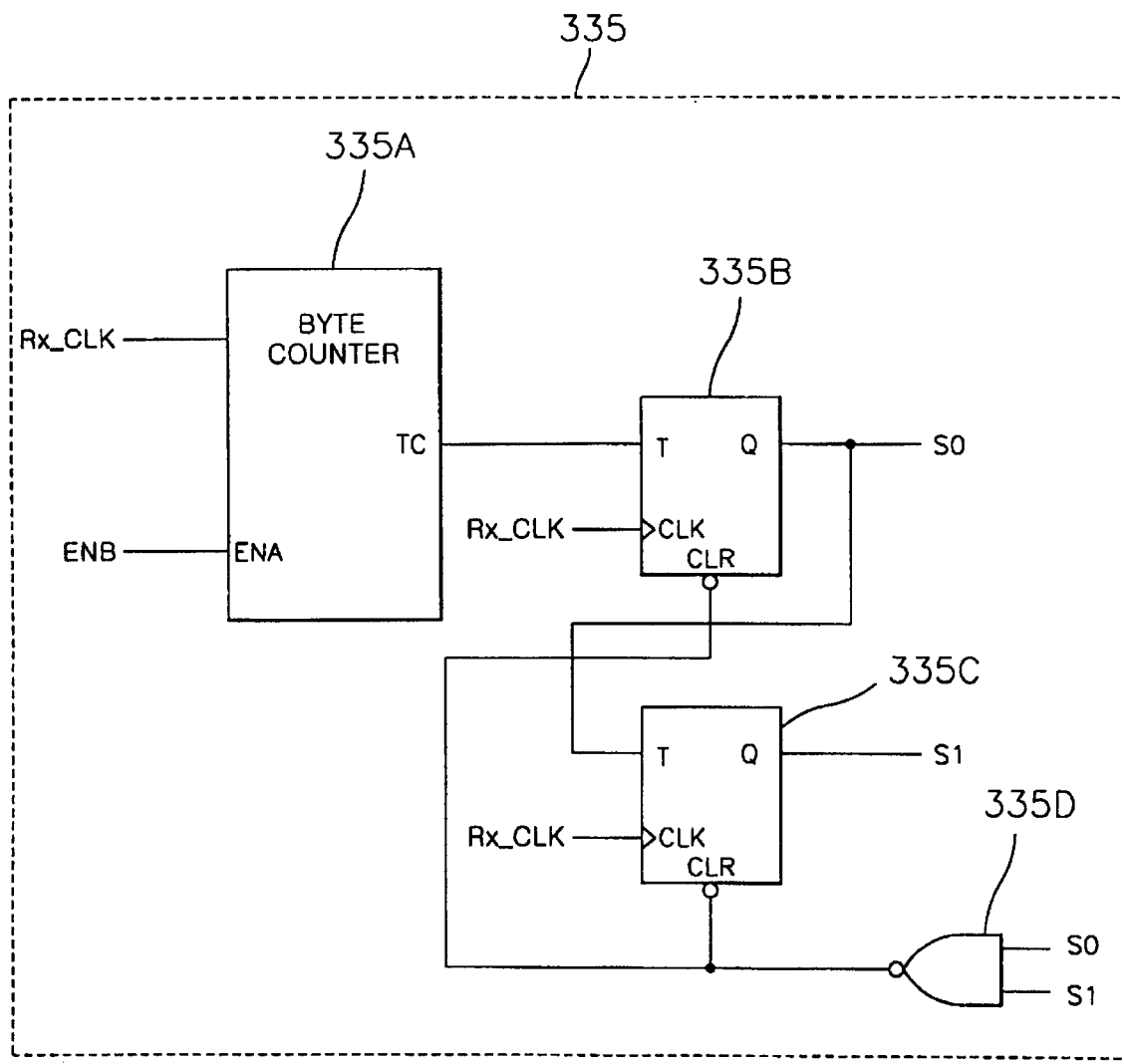
FIG. 4 is a detailed block diagram of the first-in first-out (FIFO) controller of the ATM cell multiplexing unit depicted in FIG. 3.

FIG. 4 illustrates a configuration of the FIFO control unit in accordance with the present invention. As shown in FIG. 4, the FIFO control unit 335 includes: a byte counter 335A for counting cells in a unit of 53 bytes; a first T-flip-flop 335B for producing the first FIFO control signal according to a cell counting carry generated by the byte counter 335A; a second T-flip-flop 335C for producing the second FIFO control signal according to an output signal of the first T-flip-flop 335B; and a NAND gate 335D for performing a NAND operation with respect to the first and second FIFO control signals and resetting the first and second T-flip-flops 335B and 335C using a result of the NAND operation.

Figure 6:
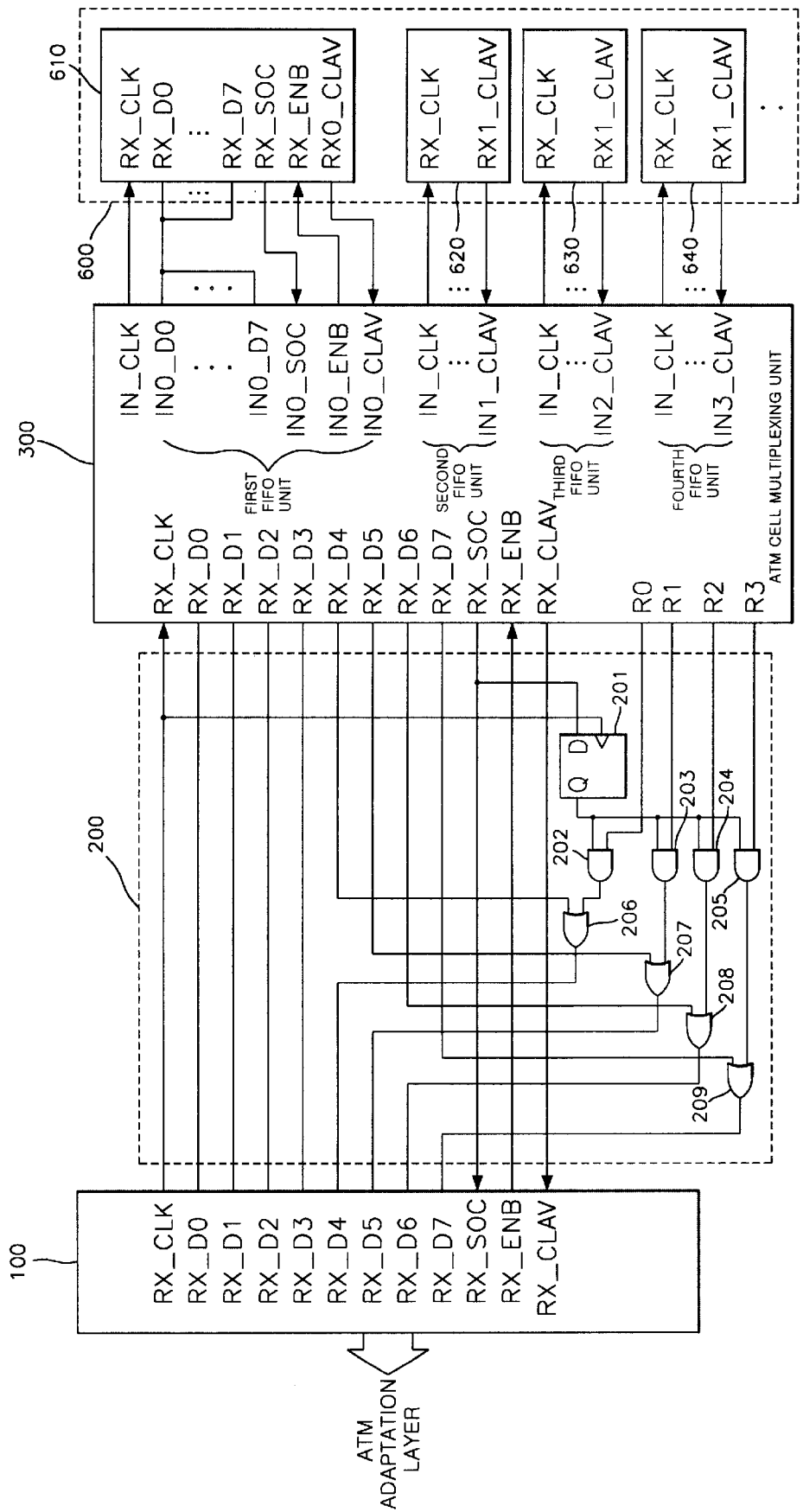
FIG. 6 is a detailed circuit diagram of the receiving routing unit depicted in FIG. 2.

FIG. 6 is a circuit diagram showing a configuration of the receiving routing unit in accordance with the present invention. As shown in the drawing, the receiving routing unit 200 includes: a D-flip-flop 201 for buffering a first byte indication signal, RX_SOC, of a receiving ATM cell of the ATM layer device 100 according to a clock, RX_CLK, provided whenever the ATM layer device 100 receives a cell; first to fourth AND gates 202 to 205 for performing each AND operation with respect to an output signal of the D-flip-flop 201 and the respective decoding signals generated by the decoder 331 in the ATM cell multiplexing unit 300; first to fourth OR gates 206 to 209 for selectively performing each OR operation with respect to each specified bit in the header of the cell multiplexed by the ATM cell multiplexing unit 300 and each output signal of the first to fourth AND gates 202 to 205, thus generating routing information for indicating a physical layer device which has transmitted the multiplexed cell as a result of the OR operation.

The physical layer device unit 600 consists of first to fourth physical layer devices 610 to 640 for transmitting/receiving ATM cells to/from the single ATM layer device 100 over the UTOPIA interface.

Figure 7:
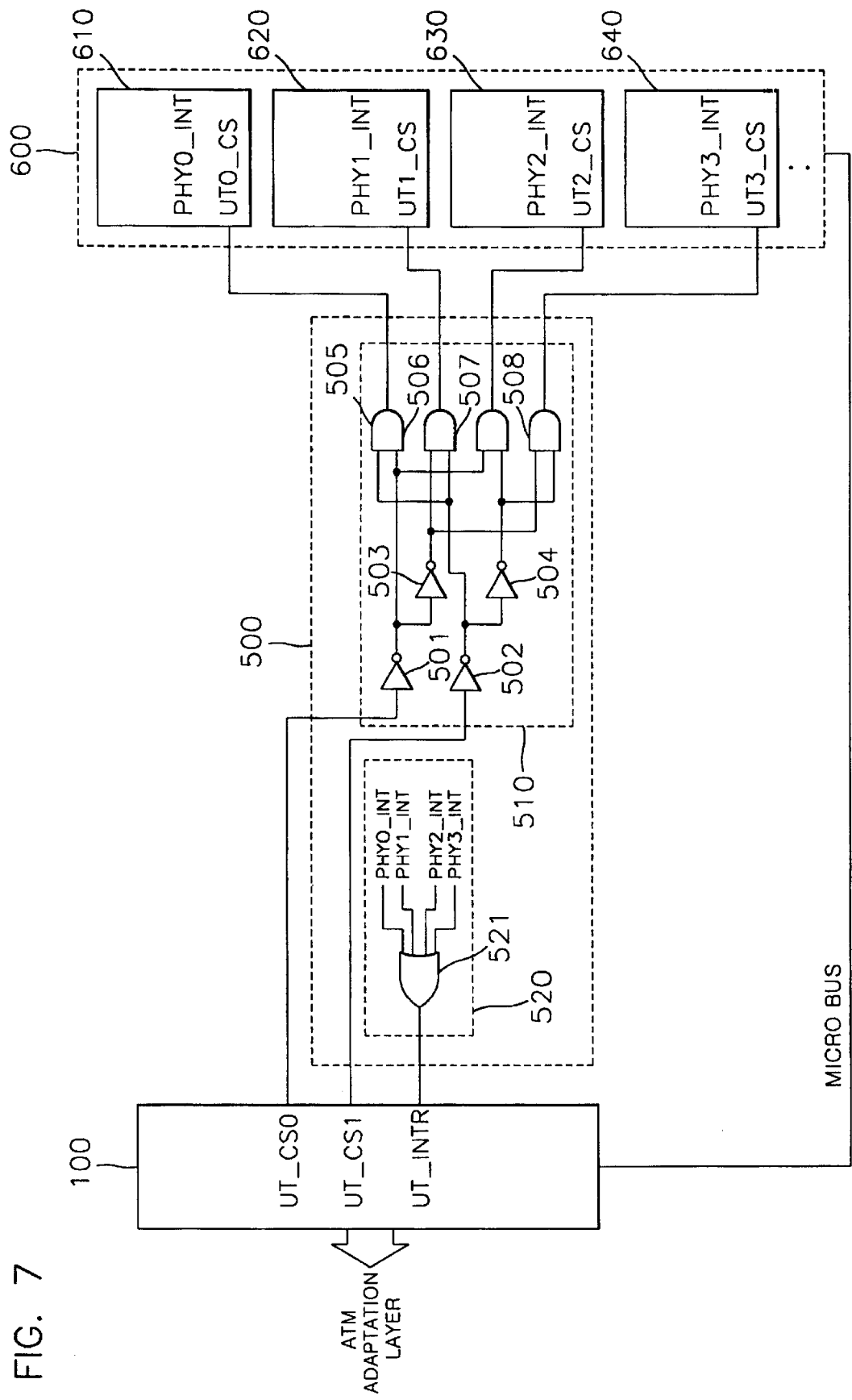
FIG. 7 is a detailed circuit diagram of the micro bus interface unit depicted in FIG. 2.
Figure 8:
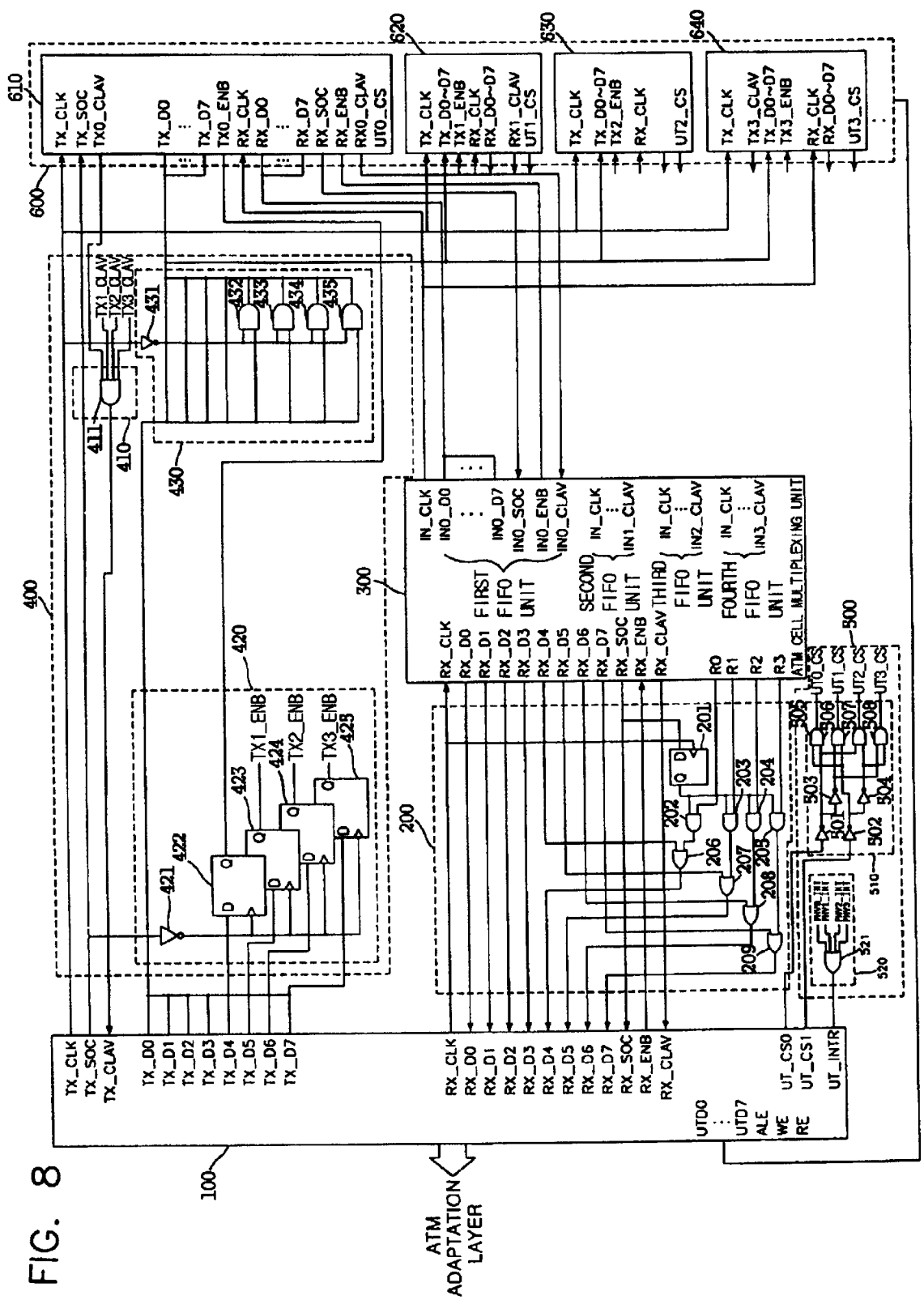
FIG. 8 is a detailed circuit diagram of each block depicted in FIG. 2.

FIG. 7 is a circuit diagram of the micro bus. interface unit in accordance with the present invention. As shown in the drawing, the micro bus interface unit 500 includes: an interrupt accepting unit 520 for transmitting an interrupt signal which is generated when errors occur in the multiple physical layer devices 610 to 640 to the ATM layer device 100; and a physical device selection unit 510 for selecting a physical layer device for transmission/reception of the operation and management information.

The interrupt accepting unit 520 consists of an OR gate 521 for operating an OR operation with respect to interrupt signals generated by each physical layer device 610 to 640 in the physical layer device unit 600 and sends an operated result to the ATM layer device 100.

The physical device selection unit 510 includes: a first inverter 501 for inverting a first device control signal, UT_CS0, forwarded from the ATM layer device 100; a second inverter 502 for inverting a second device control signal, UT_CS1, forwarded from the ATM layer device 100; third and fourth inverters 503 and 504 for respectively inverting output signals of the first and second inverters 501 and 502; and first to fourth AND gates 505 to 508 for selectively performing each AND operation with respect to output signals of the first to fourth inverters 501 to 504 to generate first to fourth device selection signals for selection of a physical layer device.

The following description relates to operation of the ATM cell multiplexing/demultiplexing apparatus according to the present invention which has such configuration as illustrated above.

First, the demultiplexing operation will be described where ATM cells are transmitted from the single ATM layer device 100 to the four physical layer devices 610 to 640 on the basis of the UTOPIA 1 level interface which matches a single ATM layer device with a single physical layer device other than the UTOPIA 2 level interface which matches a number of ATM layer devices with a number of physical layer devices.

The ATM layer device 100 inserts routing information in the first four bits of the VPI field in an ATM cell header for allowing the ATM cell received from an AAL to be transmitted to a corresponding physical layer device amongst a number of physical layer devices 610 to 640. Here, the routing information may be inserted in the GFC field of the ATM cell header other than the VPI field, but, in the embodiment of the present invention, the routing information is supposed to be inserted in the VPI field.

Subsequently, the first physical layer device 610 in the physical layer device unit 600 generates a signal, TX0_CLAV, for indicating cell receptivity thereof, and then the ready for receiving signal generation unit 410 in the decoding/demultiplexing unit 400 transmits the ready for receiving signal, TX0_CLAV, to the ATM layer device 100.

The ATM layer device 100 responsive to the ready for receiving signal, TX0_CLAV, transmits the 53-byte ATM cell to the decoding/demultiplexing unit 400, and, at the same time, transmits a first byte indication signal, TX_SOC, for the 53 bytes in the transmission cell to each physical layer device 610 to 640. The inverter 421 in the routing information extraction unit 420 inverts the first byte indication signal, TX-SOC, and provides an inverted signal to the first to fourth D-flip-flops 422 to 425 as a clock.

The first to fourth D-flip-flops 422 to 425 in turn respectively buffer the routing information which is inserted in four bits (from fifth bit to eighth bit) of the first byte of the transmission cell according to clocking of the output signal of the inverter 421. If the routing information which is inserted in bits from the fifth to the eighth, TX_D4 to TX_D7, among the first byte bits, TX_D0 to TX_D7, of the transmission cell has a value of "0, 1, 0, 0", this means that the transmission cell would be transmitted to the second physical layer device 620. If the value of the routing information of the transmission cell is "1, 0, 0, 0", this means that only the fifth bit among the bits in the first byte of the transmission cell is "HIGH", so that only the first D-flip-flop 422 sends a signal, TX0_ENB, indicating validity of the transmission cell to an input terminal, TX0_ENB, of the first physical layer device 610 in an active state.

After the routing information is extracted, the routing information removing unit 430 removes the routing information which has been inserted in the first four bits of the VPI field in the cell header for transmission between the ATM layer device 100 and the physical layer device unit 600 to accurately transmit the ATM cell to an end point. The inverter 431 in the routing information removing unit 430 inverts the signal, TX-SOC, indicating the first byte of the transmission cell. The first to fourth AND gates 432 to 435 perform each AND operation with respect to an output signal of the inverter 431 and respective bits from the fifth to the eighth of the first byte in the transmission cell header so as to generate a low signal, thereby removing the routing information. The ATM cell from which the routing information was removed, is transmitted to the first physical layer device 610.

When the third physical layer device 630 transmits a signal, TX2_CLAV, indicating its cell receptivity to the ATM layer device 100 in the active state, the ATM layer device 100 feed an ATM cell to be transmitted to the third physical layer device 630 and the signal, TX_SOC, indicating the first byte of the transmission cell in the active state. The routing information extraction unit 420 extracts the routing information and transmits a signal, TX2_ENB, indicating the validity of the transmission cell to the third physical layer device 630 in the active state. The ATM cell from which the routing information was removed, is transmitted to the third physical layer device 630.

This invention inserts the simple routing information into four bits from the fifth to the eighth of the first byte in an ATM cell header and demultiplexes the cell into a corresponding physical layer device according to the routing information, thereby reducing a burden caused by complicated operation for analyzing the ATM cell header. In addition, this invention does not require buffers for buffering ATM cells and extracts the routing information using D-flip-flops, thereby simply performing the demultiplexing operation. The ATM cells can simply demultiplexed from the single ATM layer device 100 into the number of physical layer devices 610 to 640 through such operation.

Next, the case where the ATM layer device 100 receives ATM cells from the physical layer device unit 600 on the basis of the UTOPIA 1 level interface will now be described.

The physical layer device unit 600 transmits the ATM cells via the ATM cell multiplexing unit 300 to the ATM layer device 100.

In other words, once the first physical layer device 610 sends a ready for sending signal, RX_CLAV, to the first FIFO unit 311 in the ATM cell multiplexing unit 300, the first FIFO unit 311 sends a ready for receiving signal, RX ENB, to the first physical layer device 610. Subsequently, the first physical layer device 610 sends a signal, RX_SOC, indicating the first byte of the cell to the first FIFO unit 311 together with the ATM cell. Through a similar process, the second to fourth physical layer devices 620 to 640 respectively transmit the ATM cells to the corresponding second to fourth FIFO units 312 to 314 in the ATM cell multiplexing unit 300. Thus the first to fourth FIFO units 311 to 314 receive the ATM cells from the first to fourth physical layer devices 610 to 640 and buffer the cells.

The multiplexing unit 320 in the ATM cell multiplexing unit 300 multiplexes the ATM cells fed from the first to fourth FIFO units 311 to 314 into the ATM layer device 100 according to the control of the multiplexing control unit 330. In other words, once the multiplexing unit 320 sends the ready for sending signal, RX_CLAV, to the ATM layer device 100, the ATM layer device 100 sends the ready for receiving signal, RX_ENB, to both the multiplexing unit 320 and multiplexing control unit 330.

Hence, the multiplexing control unit 330 receives the ready for receiving signal, RX_ENB, according to a receiving clock provided by the ATM layer device 100 and controls the multiplexing unit 320. Specifically, the byte counter 335A of the FIFO control unit 335 in the multiplexing control unit 330 counts 53 when the ready for receiving signal, RX_ENB, is active. When transmitting the first ATM cell, the first and second FIFO control signals, S0 and S1, respectively produced by the first and second T-flip-flops 335B and 335C are outputted as low signals. When counting bytes for an ATM cell to be transmitted next, the first T-flip-flop 335B produces the first FIFO control signal, S0, as a high signal, and the second T-flip-flop 335C produces the second FIFO control signal, S1, as a low signal.

Once the first and second FIFO control signals, S0 and S1, are produced as the low signal, the multiplexing unit 320 fetches a single cell from the first FIFO unit 311 and outputs the first byte indication signal, RX_SOC, of the cell at the time of output of the first byte of the cell, simultaneously. Alternatively, when the first FIFO control signal, S0, is produced as the high signal and the second FIFO control signal, S1, is produced as the low signal, the multiplexing unit 320 fetches a single cell from the second FIFO unit 312. When the first FIFO control signal, S0, is produced as the low signal and the second FIFO control signal, S1, is produced as the high signal, the multiplexing unit 320 fetches a single cell from the third FIFO unit 313. When the first FIFO control signal, S0, is produced as the high signal and the second FIFO control signal, S1, is produced as the high signal, the multiplexing unit 320 fetches a single cell from the fourth FIFO unit 314. The decoder 331 decodes the first and second FIFO control signals, S0 and S1, and outputs a first decoding signal, R0, as the high signal in the active state and second to fourth decoding signals, R1 to R3, in an inactive state. When the first FIFO control signal, S0, is "HIGH" and the second FIFO control signal, S1, is "LOW", the decoder 331 also outputs only the second decoding signal, R1, in the active state. When the first FIFO control signal, S0, is "LOW" and the second FIFO control signal, S1, is "HIGH", the decoder 331 outputs only the third decoding signal, R2, in the active state. When both the first and second FIFO control signals, S0 and S1, are "HIGH", the decoder 331 outputs only the fourth decoding signal, R3, in the active state.

The ATM cell is outputted from the ATM cell multiplexing unit 300 in this way, the receiving routing unit 200 performs OR operations with respect to the multiplexing control signals and the first byte indication signal, RX_SOC, to as to produce routing information, inserts the routing information within the ATM cell, and sends the cell to the ATM layer device 100 together with the first byte indication signal, RX_SOC.

Specifically, the D-flip-flop 201 in the receiving routing unit 200 latches the first byte indication signal, RX_SOC, according to the receiving clock, RX_CLK, provided by the ATM layer device 100, thus generating the high signal. The first AND gate 202 then performs an AND operation with respect to an output signal of the D-flip-flop 201 and the first decoding signal, R0, produced in the active state by the decoder 331 in the multiplexing control unit 330, thus generating the high signal. The first OR gate 206 performs the OR operation with respect to the fifth bit, RX_D4, of the first byte in the header of the cell transmitted from the ATM cell multiplexing unit 300 and an output signal of the first AND gate 202 and generates routing information indicating that the cell is transmitted from the first physical layer device 610 in a form of a high signal as an operated result. Through similar operation to that of the first AND gate 202, the second to fourth AND gates 203 to 205 perform each AND operation with respect to the output signal of the D-flip-flop 201 and respective, inactive second to fourth decoding signals, R1 to R3, thus producing low signals. The second to fourth OR gates 207 to 209, through similar operation of that of the first OR gate 206, perform each OR operation with respect to respective output signals of the second to fourth AND gates 203 to 205 and respective three bits from the sixth to the eighth, RX_D5 to RX_D7, of the first byte in the header of the cell transmitted from the ATM cell multiplexing unit 300, thus generating routing information as an operated result. So, the routing information having a value of "1000" is generated and inserted in four bits from the fifth to the eighth of the first byte within the cell header by one bit. Consequently, the ATM layer device 100 recognizes that the ATM cell is transmitted from the first physical layer device 610 through the routing information within the ATM cell header.

Essentially, the multiplexing unit 320 in the ATM cell multiplexing unit 300 selects the single ATM cell from the FIFO unit which is selected based upon the first and second FIFO control signals, S0 and S1, and the receiving routing unit 200 inserts the routing information within the cell header before transmitting the cell to the ATM layer device 100, thereby to enable the ATM layer device 100 to identify the physical layer device from which the ATM cell was transmitted. Consequently, the cell multiplexing operation is easily implemented through insertion of the control signals used to control the ATM cell multiplexing operation within the cell header as the routing information.

Alternatively, in case where the physical layer device generates an interrupt signal commanding to interrupt ATM cell transmission for a while since the physical layer device cannot receive the ATM cells due to occurrence of failure, the OR gate 521 in the interrupt accepting unit 520 receives the interrupt signal and produces an active signal, thereby requesting the ATM layer device 100 to interrupt the transmission of the ATM cells.

In case where the ATM layer device 100 transmits/receives the operation and management information to/from the physical layer device unit 600, the ATM layer device 100 produces first and second device control signals, UT_CS0 and UT_CS1, having the value "0" to select the first physical layer device 610. Subsequently, the first to fourth AND gates 505 to 508 respectively generate values "1", "0", "0", "0", and the first physical layer device 610 which receives an output signal of the first AND gate 505 is selected. The ATM layer device 100 transmits control data to the selected first physical layer device 610 which is directly connected thereto via a micro bus. Moreover, if the ATM cell multiplexing/demultiplexing circuit is extended, this invention is capable of multiplexing/demultiplexing the ATM cells between a single ATM layer device and a number of physical layer devices.

As illustrated, the ATM cell multiplexing/demultiplexing apparatus of this invention multiplexes and demultiplexes the ATM cells between the single ATM layer device and the number of physical layer devices using the UTOPIA 1 level interface which matches the single ATM layer device with the single physical layer device.

Like such cases as connecting a fabric port of 622 Mbps to a port of 155 Mbps and connecting a fabric port of 155 Mbps to a port of 25 Mbps, this invention can implement various configurations for the line interface module (LIM) of an ATM switch. In addition, this invention can simply multiplexes and demultiplexes low speed ATM cells into high speed ATM cells.

As illustrated above, the present invention inserts the simple routing information for multiplexing/demultiplexing within the ATM cell header, thereby multiplexing/demultiplexing the ATM cells between the single ATM layer device and the number of physical layer devices on the basis of the UTOPIA 1 level interface. In case of demultiplexing the ATM cells from the single ATM layer device into the number of physical layer devices, this invention does not require the buffers for buffering the ATM cells, thereby simplifying the configuration of the apparatus.

Since the multiplexing/demultiplexing operation is accomplished using the simple routing information without detection of the VPI and VCI by analysis of the ATM cell header, this invention can quickly perform the multiplexing/demultiplexing operation and save the time required for the header analysis. In addition, this invention can perform the multiplexing/demultiplexing operation between high speed ATM cells and low speed ATM cells. Moreover, this invention embodies an ATM cell multiplexing/demultiplexing apparatus having a simple structure, thereby implementing an ATM workgroup switch at a low cost.

It will be apparent to those skilled in the art that various modifications and variations can be made in an ATM cell multiplexing/demultiplexing apparatus of the present invention without deviating from the spirit or scope of the invention. Thus, it is intended that the present invention cover the modifications and variations of this invention provided they come within the scope of the appended claims and their equivalents.

What is claimed is:

1. In an asynchronous transfer mode (ATM) system having a plurality of physical layer devices for transmitting ATM cells at low speed and an ATM layer device for transmitting ATM cells at high speed, an ATM cell multiplexing/demultiplexing apparatus comprising:
- a decoding/demultiplexing unit for extracting routing information from the header of each said ATM cell transmitted from the ATM layer device and demultiplexing the ATM cell according to the routing information extracted into the plurality of physical layer devices;
- an ATM cell multiplexing unit for multiplexing the ATM cells transmitted from the plurality of physical layer devices into the ATM layer device;
- a receiving routing unit for inserting routing information within a header of each said ATM cell multiplexed by the ATM cell multiplexing unit; and
- a micro bus interface unit for interfacing the ATM layer 20 device and the plurality of physical layer devices with respect to system operation and management information and transmitting an interrupt signal of each physical layer device to the ATM layer device;
- the receiving routing unit comprises:
  - a D-flip-flop for buffering a signal for indicating a first byte of each ATM cell received within the ATM layer device according to a clock provided when the ATM layer device receives a cell;
  - first to fourth AND gates for performing each AND operation with respect to an output signal of the D-flip-flop and respective multiplexing control signals generated by a decoder in the ATM cell multiplexing unit;
  - first to fourth OR gates for selectively performing each OR operation with respect to respective specified bits in a header of each cell multiplexed by the ATM cell multiplexing unit and respective output signals of the first to fourth AND gates and generating the routing information for indicating a physical layer device which has transmitted the multiplexed cell as a result of the OR operation.

2. In an asynchronous transfer mode (ATM) system having a plurality of physical layer devices for transmitting ATM cells at low speed and an ATM layer device for transmitting ATM cells at high speed, an ATM cell multiplexing/demultiplexing apparatus comprising:
- a decoding/demultiplexing unit for extracting routing information from the header of each said ATM cell transmitted from the ATM layer device and demultiplexing the ATM cell according to the routing information extracted into the plurality of physical layer devices;
- an ATM cell multiplexing unit for multiplexing the ATM cells transmitted from the plurality of physical layer devices into the ATM layer device;
- a receiving routing unit for inserting routing information within a header of each said ATM cell multiplexed by the ATM cell multiplexing unit; and
- a micro bus interface unit for interfacing the ATM layer 20 device and the plurality of physical layer devices with respect to system operation and management information and transmitting an interrupt signal of each physical layer device to the ATM layer device;
- the micro bus interface unit comprises:
  - an interrupt accepting unit for transmitting the interrupt signal generated when errors occur in each physical layer device to the ATM layer device; and
  - a physical device selection unit for selecting a physical 20 layer device for transmitting/receiving the operation and management information;
  - the physical device selection unit comprises:
    - a first inverter for inverting a first device control signal forwarded by the ATM layer device;
    - a second inverter for inverting a second device control signal forwarded by the ATM layer device;
    - third and fourth inverters for respectively inverting output signals of the first and second inverters; and
    - first to fourth AND gates for selectively performing each AND operation with respect to output signals of the first to fourth inverters and generating first to fourth device selection signals for selecting a physical layer device for operation and management as a result of the operation.

3. In an asynchronous transfer mode (ATM) system having a plurality of physical layer devices for transmitting ATM cells at low speed and an ATM layer device for transmitting ATM cells at high speed, an ATM cell multiplexing/demultiplexing apparatus comprising:
- a decoding/demultiplexing unit for extracting routing information from the header of each said ATM cell transmitted from the ATM layer device and demultiplexing the ATM cell according to the routing information extracted into the plurality of physical layer devices;
- an ATM cell multiplexing unit for multiplexing the ATM cells transmitted from the plurality of physical layer devices into the ATM layer device;
- a receiving routing unit for inserting routing information within the header of each said ATM cell multiplexed by the ATM cell multiplexing unit; and
- a micro bus interface unit for interfacing the ATM layer device and the plurality of physical layer devices with respect to system operation and management information and transmitting an interrupt signal of each physical layer device to the ATM layer device;
- the ATM cell multiplexing unit comprises:
  - first to fourth first-in first-out (FIFO) units for respectively buffering and performing FIFO operation with respect to each ATM cell transmitted from the plurality of physical layer devices;
  - a multiplexing unit for multiplexing each ATM cell transmitted from the first to fourth FIFO units according to a multiplexing control signal; and a multiplexing control unit for controlling the multiplexing unit.

4. The apparatus according to claim 3, wherein the multiplexing control unit comprises:
- a FIFO control unit for generating first and second FIFO control signals for controlling the multiplexing unit; and
- a decoder for generating first to fourth decoding signals for creating routing information by decoding the first and second FIFO control signals generated by the FIFO control unit.

5. The apparatus according to claim 4, wherein the FIFO control unit comprises:
- a byte counter for counting ATM cells in a unit of 53 bytes;
- a first T-flip-flop for producing the first FIFO control signal by changing a state of a current output signal thereof during a cycle of a receiving clock according to a cell counting carry generated by the byte counter;
- a second T-flip-flop for producing the second FIFO control signal by changing a state of a current output signal thereof during a cycle of a receiving clock according to the first FIFO control signal from the first T-flip-flop; and a NAND gate for performing a NAND operation with respect to the first and second FIFO control signals and resetting the first and second T-flip-flops using a result value of the NAND operation.

6. In an asynchronous transfer mode (ATM) system having a plurality of physical layer devices for transmitting ATM cells at low speed and an ATM layer device for transmitting ATM cells at high speed, an ATM cell multiplexing/demultiplexing apparatus comprising:

a decoding/demultiplexing unit for extracting routing information from the header of each said ATM cell transmitted from the ATM layer device and demultiplexing the ATM cell according to the routing information extracted into the plurality of physical layer devices;

an ATM cell multiplexing unit for multiplexing the ATM cells transmitted from the plurality of physical layer devices into the ATM layer device;

a receiving routing unit for inserting routing information within a header of each said ATM cell multiplexed by the ATM cell multiplexing unit; and a micro bus interface unit for interfacing the ATM layer 20 device and the plurality of physical layer devices with respect to system operation and management information and transmitting an interrupt signal of each physical layer device to the ATM layer device;

the decoding/demultiplexing unit comprises:
   a ready for receiving signal generation unit for generating a signal for indicating that the plurality of physical layer devices can receive cells;
   a routing information extraction unit for extracting the 5 routing information from each ATM cell transmitted from the ATM layer device; and
   a routing information removing unit for removing the routing information from each ATM cell before transmitting it to the plurality of physical layer devices.

7. The apparatus according to claim 6, wherein the routing information extraction unit comprises:
   an inverter for inverting a first byte indication signal for each transmission cell generated by the ATM layer device; and
   first to fourth D-flip-flops for buffering unused, first four bits of a general flow control (GFC) field or virtual path identifier (VPI) field in each ATM cell header according to clocking of a signal produced by the inverter and transmitting the four bits to each corresponding physical layer device as a signal for indicating validity of the cell.

8. The apparatus according to claim 6, wherein the routing information removing unit comprises:
   an inverter for inverting a first byte indication signal of each transmission cell generated by the ATM layer device and transmitting an inverted signal to a number of AND gates; and
   first to fourth AND gates for performing each AND operation with respect to an output signal of the inverter and each unused, specified bit in a GFC field or VPI field in the ATM cell header, thereby respectively removing the routing information by one bit, resulting in removing the whole four-bit routing information.

9. The apparatus according to claim 6, wherein the ATM cell multiplexing unit comprises:
   first to fourth first-in first-out (FIFO) units for respectively buffering and performing FIFO operation with respect to each ATM cell transmitted from the number of physical layer devices;
   a multiplexing unit for multiplexing each ATM cell transmitted from the first to fourth FIFO units according to a multiplexing control signal; and
   a multiplexing control unit for controlling the multiplexing unit.

10. The apparatus according to claim 6, wherein the receiving routing unit comprises:
    a D-flip-flop for buffering a signal for indicating a first byte of each ATM cell received within the ATM layer device according to a clock provided when the ATM layer device receives a cell;
    first to fourth AND gates for performing each AND operation with respect to an output signal of the D-flip-flop and respective multiplexing control signals generated by a decoder in the ATM cell multiplexing unit;
    first to fourth OR gates for selectively performing each OR operation with respect to respective specified bits in a header of each cell multiplexed by the ATM cell multiplexing unit and respective output signals of the first to fourth AND gates and generating the routing information for indicating a physical layer device which has transmitted the multiplexed cell as a result of the OR operation.

11. The apparatus according to claim 6, wherein the micro bus interface unit comprises:
    an interrupt accepting unit for transmitting the interrupt signal generated when errors occur in each physical layer device to the ATM layer device; and
    a physical device selection unit for selecting a physical layer device for transmitting/receiving the operation and management information.

12. The apparatus according to claim 6, wherein
    the routing information unit includes an inverter for inverting a first byte indication signal for each transmission cell generated by the ATM layering device; and
    the routing information removing unit includes an inverter for inverting a first byte indication signal of each transmission cell generated by the ATM layer device and transmitting an inverted signal to a number of AND gales.

13. The apparatus according to claim 12, wherein the routing information removing unit also includes:
    first to fourth AND gates for performing each AND operation with respect to an output signal of the inverter and each unused, specified bit in a GFC field or VPI field in the ATM cell header, thereby respectively removing the routing information by one bit, resulting in removing the whole four bit routing information.

14. The apparatus according to claim 12, wherein the routing information extraction unit also includes:
    first to fourth D-flip-flops for buffering unused, first four bits of a general flow control (GFC) field or virtual path identifier (VPI) field in each ATM cell header according to clocking of a signal produced by the inverter and transmitting the four bits to each corresponding physical layer device as a signal for indicating validity of the cell.

15. The apparatus according to claim 14, wherein the routing information removing unit also includes:
    first to fourth AND gates for performing each AND operation with respect to an output signal of the inverter and each unused, specified bit in a GFC field or VPI field in the ATM cell header, thereby respectively removing the routing information by one bit, resulting in removing the whole four bit routing information.

16. The apparatus according to claim 15, wherein the ATM cell multiplexing unit comprises:

first to fourth first-in first-out (FIFO) units for respectively buffering and performing FIFO operation with respect to each ATM cell transmitted from the number of physical layer devices;

a multiplexing unit for multiplexing each ATM cell transmitted from the first to fourth FIFO units according to a multiplexing control signal; and a multiplexing control unit for controlling the multiplexing unit.

17. The apparatus according to claim 16, wherein the receiving routing unit comprises:

a D-flip-flop for buffering a signal for indicating a first byte of each ATM cell received within the ATM layer device according to a clock provided when the ATM layer device receives a cell;

first to fourth AND gates for performing each AND operation with respect to an output signal of the D-flip-flop and respective multiplexing control signals generated by a decoder in the ATM cell multiplexing unit;

first to fourth OR gates for selectively performing each OR operation with respect to respective specified bits in a header of each cell multiplexed by the ATM cell multiplexing unit and respective output signals of the first to fourth AND gates and generating the routing information for indicating a physical layer device which has transmitted the multiplexed cell as a result of the OR operation.

18. The apparatus according to claim 17, wherein the micro bus interface unit comprises:

an interrupt accepting unit for transmitting the interrupt signal generated when errors occur in each physical layer device to the ATM layer device; and a physical device selection unit for selecting a physical layer device for transmitting/receiving the operation and management information.

* * * * *